Nov. 20, 1945.   W. J. MATTOX   2,389,444
MANUFACTURE OF STYRENE
Filed Feb. 11, 1942
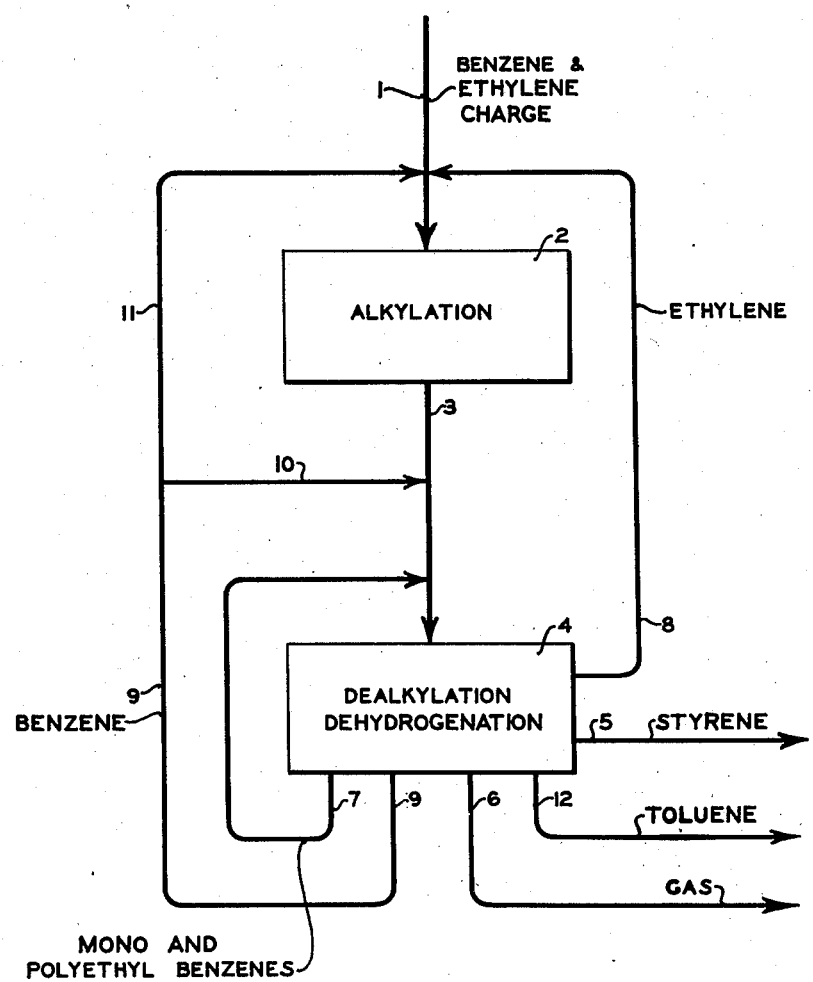
INVENTOR
WILLIAM J. MATTOX
BY
ATTORNEY Patented Nov. 20, 1945

2,389,444

UNITED STATES PATENT OFFICE 2,389,444

MANUFACTURE OF STYRENE

William J. Mattox, Chicago, Ill., assignor to Universal Oil Products Company, Chicago, Ill., a corporation of Delaware Application February 11, 1942, Serial No. 430,504

2 Claims. (Cl. 260—669)

This invention relates to a process for manufacturing styrene from benzene and ethylene. More particularly, the invention relates to a combination process for alkylating benzene and conbinating the resulting alkylation products into styrene.

The alkylation of benzene with ethylene to produce mono-ethyl benzene is accompanied by the formation of substantial quantities of poly-ethyl benzene, particularly diethyl benzene. Although these products may have some commercial value, they are undesirable when the alkylation step is being carried out for the maximum production of ethyl ber zene. Large quantities of ethyl benzene are desired for the manufacture of styrene which in turn is used in manufacturing synthetic rubber, plastics, etc. By means of my invention, it is possible to realize high ultimate yields of styrene from the complex product of benzene alkylation.

In one specific embodiment the present invention comprises a combination catalytic process for manufacturing styrene from benzene and ethylene which comprises alkylating benzene and ethylene in a primary step, subjecting the alkylated reaction products comprising mono- and poly-ethyl benzenes to a conversion reaction comprising dealkylation and dehydrogenation wherein mono-ethyl benzene and poly-ethyl benzenes are converted into styrene in a secondary step, recycling the unconverted ethyl benzenes to the secondary step and returning the ethylene formed to the primary step. Alternatively, a part of the fraction boiling below mono-ethyl benzene may be returned to both steps.

The invention may be further understood by referring to the accompanying flow drawing which is purely diagrammatic and should not be construed as limiting the process to the exact conditions given therein.

Referring to the drawing, benzene and ethylene may be introduced through line 1 to alkylation step 2 wherein alkylation of benzene by means of ethylene may be accomplished by any known means, preferably catalytic. The alkylation products are passed through line 3 to the dealkylation-dehydrogenation zone 4. In this zone the products are treated with a special catalyst under operating conditions such that dehydrogenation of mono-ethyl benzene occurs. This reaction is also accompanied by the simultaneous dehydrogenation and dealkylation of poly-ethyl benzenes to produce styrene, ethylene, and hydrogen. The conversion zone 4 is intended to include the necessary separation and recovery steps for segregating the various streams as shown. Styrene is removed through line 5. Light non-condensible gases such as hydrogen, methane and ethane are removed through line 6. Unconverted poly-ethyl benzenes are recycled to the conversion step through line 7. Ethylene is passed through line 8 to alkylation step 2. The ethylene results from the dealkylation of poly-ethyl benzene in conversion step 4. A light fraction comprising benzene and other light normally liquid hydrocarbons boiling below mono-ethyl benzene is removed through line 9. A portion of this fraction may be recycled to conversion step 4 through line 10. The remaining portion is passed through line 11 to alkylation step 2. Since appreciable quantities of toluene are formed in the process these may be recovered through line 12.

Alkylation step 2 may comprise any suitable well known alkylation procedure. For example, benzene may be alkylated with ethylene using a catalyst such as phosphoric acid which has been composited with a suitable siliceous support such as kieselguhr and calcined. This catalyst is known herein as solid phosphoric acid catalyst. It is one of the most satisfactory alkylating catalysts known and may be used at a temperature within the range of about 200 to about 400° C. under superatmospheric pressures. Other types of catalyst not necessarily exactly equivalent include the Friedel-Crafts type, particularly aluminum chloride, aluminum bromide, zinc chloride, zirconium chloride, etc. These latter may be used in conjunction with hydrogen chloride or other hydrogen halides.

The conversion step 4 may be carried out in the presence of a synthetic composite catalyst comprising silica, alumina and a dehydrogenating compound. These may be prepared by a number of different methods which are not necessarily exactly equivalent.

The preferred catalyst is prepared by the separate or simultaneous precipitation of silica and alumina followed by washing to remove soluble compounds substantially completely. It is particularly important that sodium compounds be removed, although in general soluble alkali and alkaline earth metal compounds should be removed. This may be done by washing the precipitated hydrogels, either before or after drying, with dilute acid or dilute salt solutions, for example, ammonium chloride. After washing, the composite may be dried and calcined at a temperature not exceeding about 800° C. but preferably in excess of about 300° C.

The dehydrogenating oxide may be separately or simultaneously precipitated with the silica and alumina components or it may be impregnated on the dried and/or calcined silica-alumina composite. This may be done by adding soluble salts of the compound to be added, followed by decomposing the added compound either by heating or chemically by precipitation methods.

In an alternative variation not necessarily equivalent to those previously described, the catalyst may be prepared by mechanically mixing silica-alumina powder with the powdered dehydrogenating component. In this case, the dehydrogenating component may have been previously deposited on a carrier such as alumina, magnesia, or the like.

The relative proportions of the components may vary over a considerable range. Suitable catalysts comprise the proportions of approximately 100 mols of silica to about 1-30 mols of alumina and about 2-30 mols of the dehydrogenating oxide. In certain cases the proportion of silica may be reduced.

Temperatures for conducting the dealkylation-dehydrogenation reaction are within the range of about 450 to 700° C. and preferably about 500-650° C. Atmospheric pressure is satisfactory although sub-atmospheric or superatmospheric pressures may be used. As a rule, pressures below 100 pounds per square inch are to be preferred.

The liquid hourly space velocity is usually less than about 20 and suitable results are obtainable at about 0.1 to 5. The liquid hourly space velocity is described as the volumes of liquid charge per volume of catalyst per hour when measuring the charge at room temperature.

The advantage of this combination process lies in the fact that the ultimate yield of styrene produced by this method is substantially increased over that obtainable by the usual method in which benzene is alkylated with ethylene and the mono-ethyl benzene is then converted to styrene by thermal, catalytic, or non-catalytic methods.

A further advantage lies in the fact that lower ratios of benzene to ethylene may be used in the charge to the alkylation step. Although it is necessary in the usual alkylation process to use at least one mol of benzene per mol of ethylene, it is desirable to use a substantial molal excess of benzene over ethylene. The higher the benzene to ethylene ratio, the more mono-ethyl benzene formed. According to the usual method of operation high ratios of benzene to ethylene are employed, for example, 10 to 20 mols of benzene per mol of ethylene are not unusual. This necessitates the separation and recirculation of large quantities of benzene.

According to my invention lower ratios of benzene to ethylene may be used since it is no longer necessary to avoid the formation of poly-ethyl benzene. Both the mono-ethyl and poly-ethyl benzenes are converted to styrene in the second step of my process and the ethylene and benzene formed therein are recycled for further conversion.

The process also has an advantage over the usual two-stage process wherein benzene is alkylated and the mono-ethyl benzene is dehydrogenated to styrene in that all or substantially all of the material boiling below mono-ethyl benzene is recycled in part to the alkylation step and in part to the dealkylation-dehydrogenation step and is eventually converted into styrene.

Small amounts of toluene are formed but this is an advantage in the process since toluene also is in great demand.

The following example is given to illustrate the usefulness of the process but should not be construed as limiting it to the exact conditions shown.

Benzene may be alkylated with solid phosphoric acid catalyst at a temperature of about 275° C. and a pressure of about 900 pounds per square inch using a solid phosphoric acid catalyst prepared by calcining a mixture of pyrophosphoric acid and kieselguhr under controlled conditions. The ratio of benzene to ethylene may be approximately 4:1. The ethyl benzene fraction produced under these conditions normally contains about 75% of mono-ethyl benzene, the remainder being diethyl benzene with some other poly-ethyl benzenes. The reaction mixture comprising the ethyl benzenes may be supplied to the dealkylation-dehydrogenation step at a temperature of about 600° C. and substantially atmospheric pressure using a silica-alumina-chromia composite comprising 100 mols of silica, 15 mols of alumina and 12 mols of chromia. A space velocity of 1 may be used. Products recovered comprise styrene, a small percentage of toluene, and uncondensible gas. The fraction boiling below ethyl benzene is returned in approximately equal parts to the alkylation step and the dealkylation-dehydrogenation step. Poly-ethyl benzenes are returned to the latter step. Ethylene is separated and returned to the alkylation step. An ultimate yield of about 90-95% of styrene based on the ethylene charge is obtainable under such conditions.

I claim as my invention:

1. A process for producing styrene from a hydrocarbon mixture containing mono- and poly-ethylbenzenes which comprises subjecting said mixture at a temperature of from about 450° C. to about 700° C. to the action of a catalytic composite comprising silica, alumina and a dehydrogenating metal oxide.

2. A process for producing styrene from a hydrocarbon mixture containing mono- and poly-ethylbenzenes which comprises subjecting said mixture at a temperature of from about 450° C. to about 700° C. to the action of a catalyst comprising silica, alumina and chromia.

WILLIAM J. MATTOX.